Figure 1:
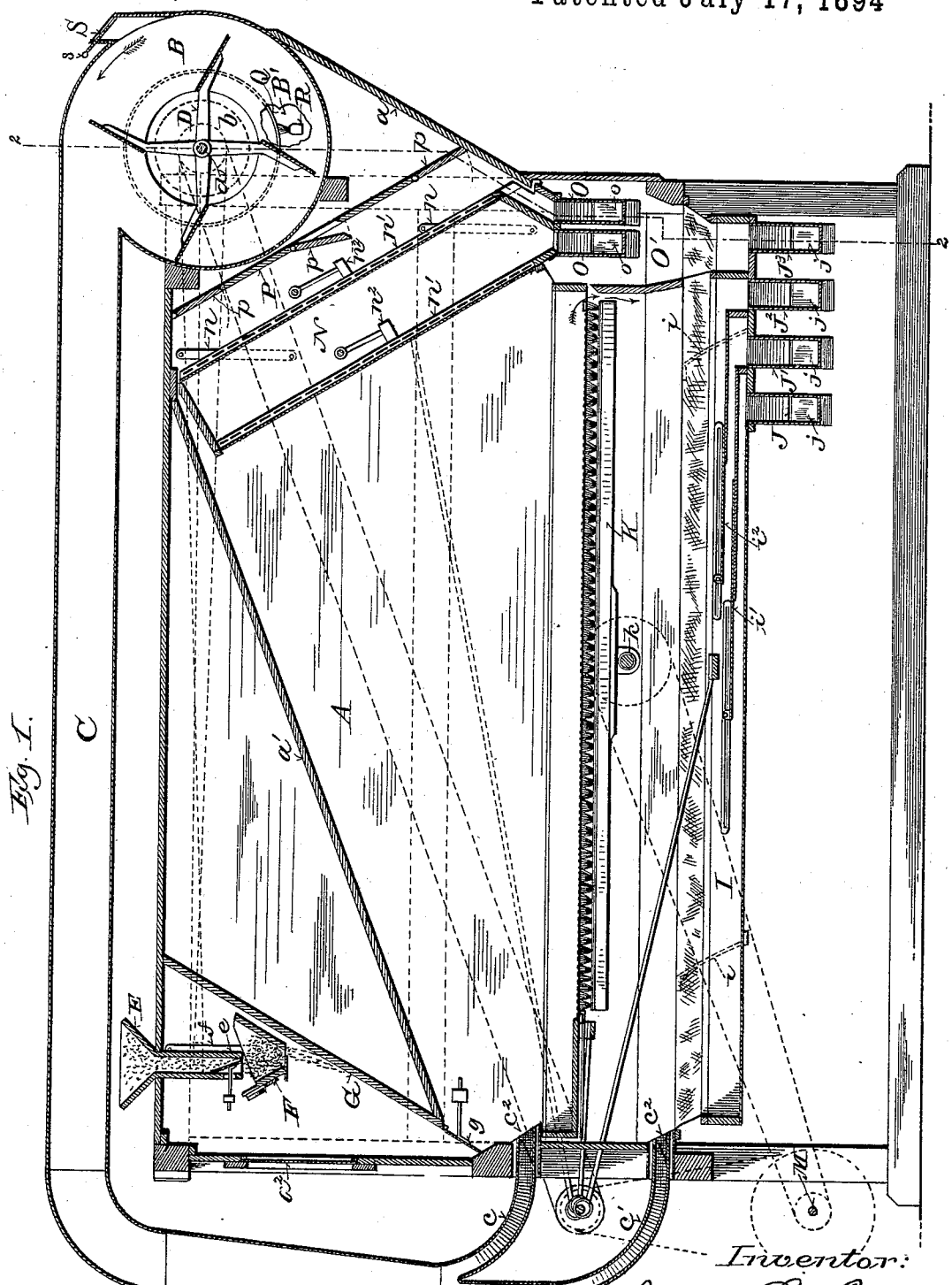

(No Model.) 3 Sheets—Sheet 1.

J. LA CROIX.
SEPARATING AND PURIFYING MACHINE.

No. 523,215. Patented July 17, 1894

Witnesses:
E. C. Asmus
Chas. L. Goss

Inventor:
Joseph La Croix
By Winter, Sanders, Smith, Bottom & Heis
Attorneys.

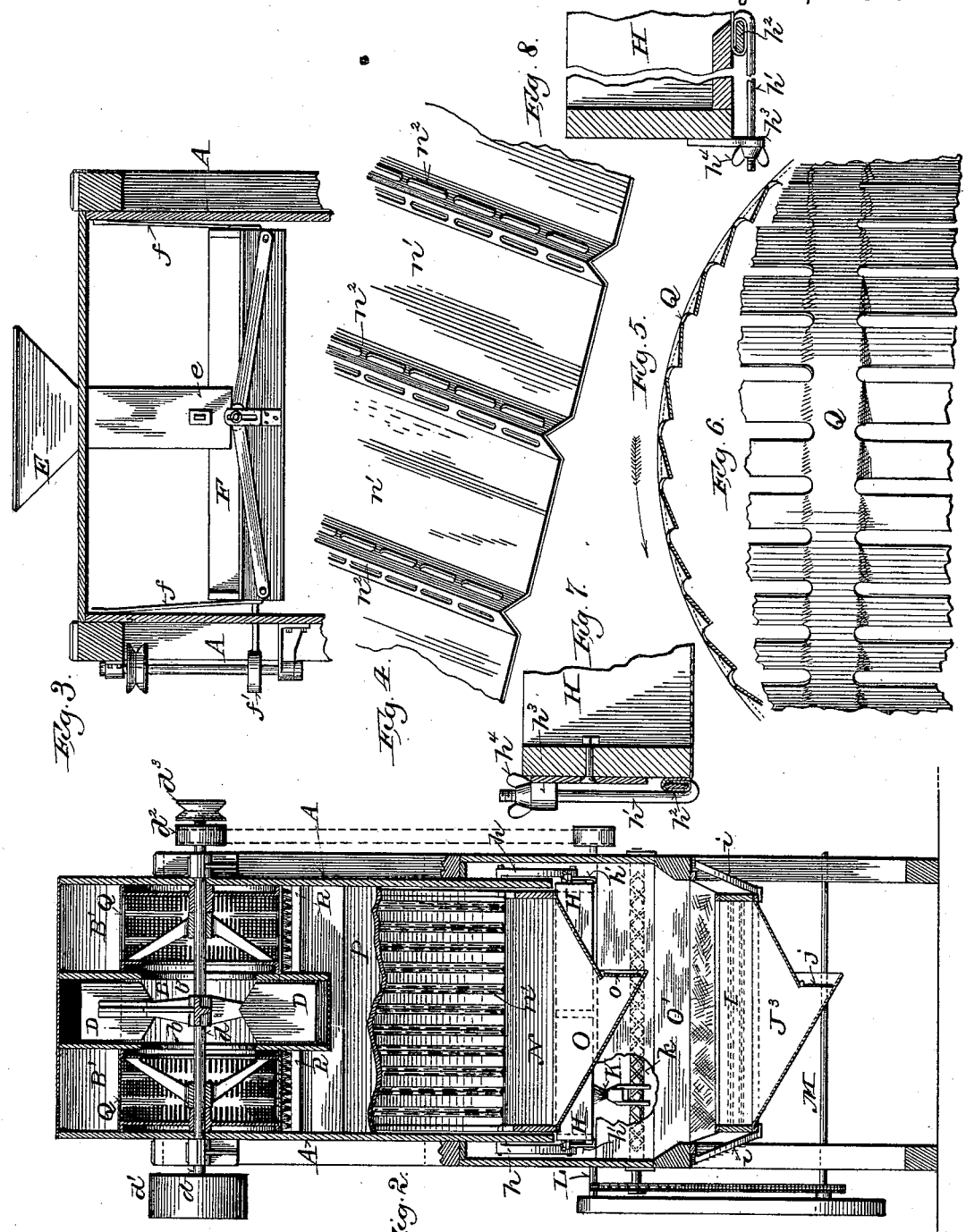

(No Model.) 3 Sheets—Sheet 3.
J. LA CROIX.
SEPARATING AND PURIFYING MACHINE.
No. 523,215. Patented July 17, 1894.
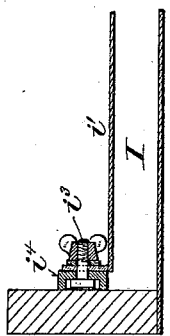
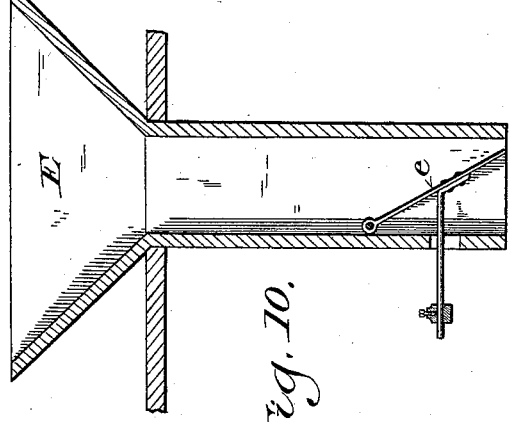
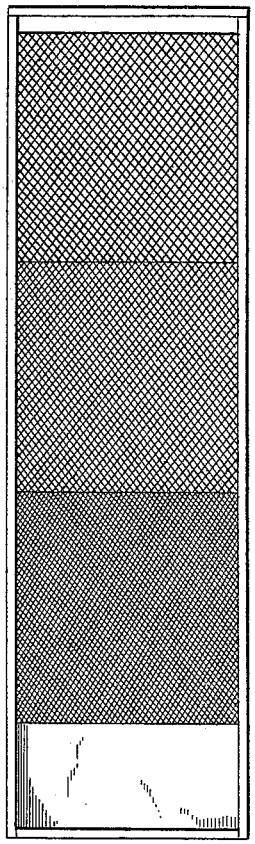
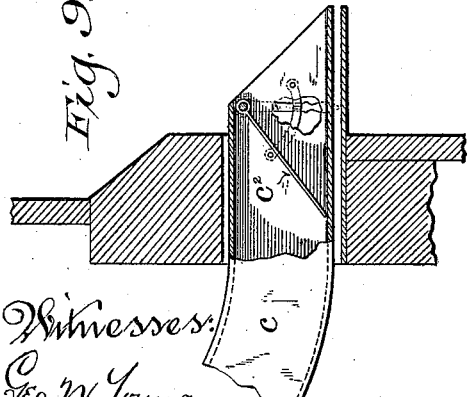
Witnesses:
Geo. W. Young.
Chas. L. Goss.
Inventor:
Joseph La Croix,
Attorneys.

UNITED STATES PATENT OFFICE.

JOSEPH LA CROIX, OF MILWAUKEE, WISCONSIN.

SEPARATING AND PURIFYING MACHINE.

SPECIFICATION forming part of Letters Patent No. 523,215, dated July 17, 1894.

Application filed May 16, 1892. Serial No. 433,100. (No model.)

*To all whom it may concern:*

Be it known that I, JOSEPH LA CROIX, of Milwaukee, in the county of Milwaukee and State of Wisconsin, have invented certain new and useful Improvements in Separating and Purifying Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to separate dust and light impurities from middlings and other materials without discharging such impurities into the surrounding air, and without drawing into the purifier, impurities contained in the outside air.

It consists of certain novel features in the construction and arrangement of the component parts of the machine hereinafter particularly described and pointed out in the claims.

In the accompanying drawings, like letters designate the same parts in the several figures.

Figure 1 is a vertical longitudinal section on the line 1, 1, Fig. 2, of a machine embodying my improvements. Fig. 2 is a vertical cross section on the line 2, 2, Fig. 1. Fig. 3 is a vertical cross section on the line 3, 3, Fig. 1 through a portion of the casing, showing the feed hoppers in elevation. Figs. 4, 5 and 6 are details illustrating the construction of the dust arresting and separating devices. Figs. 7 and 8 are details showing devices for fastening the sieves to the sieve frame. Fig. 9 is a detail view on an enlarged scale, partly in vertical section and partly in elevation, of one of the regulating valves in a branch of the air duct. Fig. 10 is a similar view of the adjustably weighted valve in the feeding device. Fig. 11 is a vertical cross section on an enlarged scale of a portion of the tray below the sieve, showing in detail one of the devices for the adjustment of the extensible cut-off plates or boards; and Fig. 12 is a plan view of the sieve.

A represents a substantially air-tight purifier chest or casing. It is formed or provided at or near the top and one end with a fan case B, on each side of which are chambers B' B' extending approximately the full width of the chest, and communicating with the fan case through the eyes $b$ $b$. An air duct C, connected with the mouth of the fan, leads to the opposite end of the machine and communicates with the purifier chamber through branches $c$ $c'$, one above the other, provided with regulating valves $c^2$ $c^2$, as shown in Fig. 9.

D is a fan inclosed in the case B and mounted upon a shaft $d$, which is supported in suitable bearings in the frame of the machine, and provided at its projecting ends with pulleys $d'$ $d^2$ $d^3$. At the opposite end of the machine is a feed hopper E, the spout of which projects and opens into the upper portion of casing A. It is provided with an adjustably weighted wing valve $e$, as shown in Fig. 10 by which its opening into the casing A is automatically closed, so as to exclude air therefrom, but to admit the material to be operated upon.

Below the discharge opening of hopper E is suspended by suitable hangers $f f$, a shaking trough F, of a length approximately equal to the width of the machine. It is provided in the bottom with an adjustable longitudinal feed opening and is reciprocated in the direction of its length by a crank or eccentric $f'$, shown in Fig. 3, which may be conveniently driven from the pulley $d^3$ on the fan shaft, as indicated by dotted lines in Fig. 1.

The trough F is arranged to discharge its contents in a continuous stream distributed uniformly approximately the entire width of the casing A, upon an inclined feed board G, at the lower edge of which is an opening into the purifier chamber, which opening is automatically closed to the admission of air by an adjustably weighted wing valve $g$ like or similar to the valve $e$, as shown in Fig. 10. These wing valves $e$ and $g$, are constructed and adjusted so as to be opened sufficiently by the weight of the material to permit of its free admission into the machine, but to automatically close and exclude the outside air from the purifying chamber when they are not subjected to the weight of material to be operated upon.

H is a shaking sieve frame, supported in an approximately horizontal position by suitable hangers $h$ $h$, just below the branch $c$ of the return air duct. It is provided with a suitable screen or screens of graduated mesh, increasing in size toward the tail end of the sieve as shown in Fig. 12 and secured to the bottom of the sieve frame, as shown in Figs. 7 and 8, by means of hooked screw rods $h'$, engaging metallic strips $h^2$ over which the edges of the screen are folded, and passing at the opposite ends through perforated ears $h^3$ on the sieve frame, and provided with thumb nuts $h^4$. Just below the lower branch $c'$ of the return air duct at the bottom of the purifier chamber, I provide a shaking tray I, having a closed bottom and supported in a horizontal position by inclined hangers $i\ i$. The space around the upper edge of the tray and the casing A is closed by canvas or other suitable flexible material, to prevent the admission of outside air into the purifier chamber. This tray is provided with a series of extensible cut-off boards or plates $i'\ i^2$, parallel with the bottom, and at its tail end with a series of pockets J J' $J^2$, formed with inclined bottoms and discharge openings at their lower ends, and provided with self closing valves $j\ j$. The sliding sections of the cut-off plates or boards are supported at the ends opposite the fixed sections by screws $i^3$, the heads of which are adjustably held in horizontal slotted ways $i^4$ attached to the sides of the tray, as shown in Fig. 11.

K represents a brush extending the entire length of the sieve H, and mounted upon a right and left grooved shaft $k$, by which it is automatically moved sidewise back and forth in contact with the lower side of the screen.

The sieve H and tray I may be conveniently reciprocated longitudinally by means of eccentrics on a horizontal shaft L at one end of the machine. The eccentric shaft may be conveniently driven from a pulley $d^3$ on the fan shaft, as shown in Fig. 1, and the screw shaft $k$ may be driven from a counter shaft M, which in turn receives its motion from the eccentric shaft through connections shown in Fig. 2, and indicated by dotted lines in Fig. 1.

In the end of the purifier chamber adjacent to the fan is supported in an inclined position, a shaking dust arrester and separator N, which is supported by suitable hangers $n\ n$, as shown in Fig. 1, and is actuated by an eccentric on the shaft L. It consists of a suitable frame to which are attached metallic plates $n'\ n'$, constructed as shown in Fig. 4, with V-shaped ribs $n^2$, the sides of which are perforated, and with imperforate portions between said ribs for catching and conducting off the dust separated from the dust laden air passing through said perforations. These plates are inclined at their upper ends toward the approaching air current and the perforated ribs are placed in an upright position on the upper sides of the plates, leaving the imperforate portions of the plates between them in position to catch and conduct off the dust which is arrested and separated from the dust laden air in its passage through said plates. At the lower edges of said plates are provided pockets O O, having inclined bottoms and lateral discharge openings provided with self closing valves $o\ o$. These pockets are inclosed in the dust and offal chamber O', separate from the purifier chamber and opening at the bottom into a separate compartment of the tray I, which is provided with a pocket $J^3$ constructed and provided with a self-closing valve $j$, like the pocket J hereinbefore referred to. An opening is left at the tail end of the screen through which the tailings are discharged into the tray I, in position to be collected with the coarser stock in pocket $J^2$. In connection with the dust arresting and separating device N, I provide knockers $n^3\ n^3$ against which the vibrating plates $n'\ n'$ strike, thereby causing the dust to slide therefrom into the pockets O. These knockers are preferably supported by elastic or yielding arms to avoid obstruction to the free movement of said plates. Between the dust arrester N and the fan case is a partition P, provided with valves $p\ p$, by which the strength of the air current may be regulated as desired.

To insure the separation from the air of any dust or impurities which may pass through the dust arrester N, I mount upon the fan shaft on each side of the fan in chambers B' B', dust catching cylinders Q Q, of sheet metal, formed and perforated as shown in Figs. 5 and 6, with holes, preferably elongated parallel with the axes of the cylinders, and presented backward with reference to the direction of rotation. These cylinders are made of a length corresponding with the width of the chambers B', and surround the eyes $b\ b$, opening into the fan case, so that the air drawn by the fan into the fan case is compelled to pass through said perforated cylinders. While the air can freely pass through the perforations into the cylinders, any particles of dust or other impurities contained therein are lodged upon the outer surface of the cylinders between the perforations, and are held thereon by the inflowing air currents until they are removed therefrom by brushes R R, and dropped upon the inclined board $a$, by which they are conducted into the pocket O at its lower edge.

To properly concentrate and direct the air current through the purifier chamber, I separate the upper portion thereof by a partition $a'$ extending from a point near the lower edge of the feed board G to the top of the purifier chamber, at a point near the upper side of the dust arrester N. In the end of the purifier case, adjacent to the shaking feed trough F, I provide a glass panel $a^2$, through which the material as it is being fed into the machine may be observed.

My improved machine operates as follows: The middlings or other material to be operated upon being fed into the hopper E, passes therefrom into the shaking feed trough F, by which it is distributed upon the feed board G, conducting it in a continuous uniform stream into the purifier chamber through the opening at its lower edge. The fan D having been set in motion, produces a continuous circulation of air through the duct C, and the purifier chamber, from whence it is drawn through the dust arresting and separating devices N and Q, the strength of the current being regulated by the valves $c^2$ $c^2$ and $p$ $p$. By means of the valves $c^2$, the air blast through the duct C may be divided in the desired proportions between the branches $c$ and $c'$, and directed into the purifier chamber more or less above and below the sieve H. The air blast entering the purifier chamber through the branch $c$, encounters the material entering said chamber through the opening just above it at the lower edge of the feed board G, and removes therefrom and carries with it, all the dust and light impurities, and distributes the material upon the sieve; the lighter being carried farther toward the tail end of the sieve, thus tending to keep the head end of the sieve supplied only with the purer heavier material, and permitting of the use of a screen of coarser mesh. The coarse impurities, too heavy to be taken up by the air current, pass over the tail end of the sieve into the pocket $J^2$. The purer finer screenings or material passing through the finer portion of the screen at the head end of the sieve, fall upon the bottom of tray I, and are conducted thereon into the pocket J. The next coarser grade falls upon the extensible cut-off board $i^2$, and is conducted thereon into pocket J', and the next grade, falling upon the cut-off board $i^2$, is conducted thereon into the pocket $J^2$, with the tailings. By the adjustment of the cut-off boards the material may be graded as desired, and in place of the arrangement shown, more or less divisions for grading may be employed. The brush K, traversing back and forth the under side of the screen, in connection with the air blast entering the purifier chamber through branch $c'$, keeps said screen clear and in proper working order. The air current entering through the branch $c'$ also removes and takes up with it through the sieve, any light dust or impurities and tends also to prevent such fluff and light impurities as are carried by the upper blast over the sieve from settling thereon which may pass through the sieve with the screenings. As the dust laden air passes through the perforations in the plates $n'$ $n'$, the impurities are arrested and caught upon the imperforate portions of said plates, by which they are conducted into the pockets O O, being discharged therefrom into the pocket $J^3$. The air, after passing through and being freed from the greater portion of its impurities by the dust arresting and separating device N, is drawn by the fan through the perforated cylinders Q Q, which remove therefrom any remaining particles of dust, and thus purified, it enters the fan case B through the eyes $b$ $b$, and is forced therefrom through the duct C, back into the purifier chamber. In this way the same air is constantly kept in circulation through the machine, and serves as the vehicle for removing and conducting away the dust and other light impurities from the middlings, grain or other material, without discharging such impurities into the outside air, or drawing into the purifier any impurities contained in the outside air. The dust is positively arrested and separated by the separators N and Q from the air which is returned to the purifier chamber in a purified condition to operate as before upon the material, without imparting thereto any of the impurities previously conducted off by it.

Various changes may be made in the details of construction and arrangement of my machine, within the spirit and intended scope of my invention. The fan and dust arresting and separating devices may be located in any convenient part of the air circuit other than that in which they are shown; the continuous air circuit, the fan and the dust arresting and separating devices may be used to advantage either with or without the sieve; the dust arresting device N may be made stationary, and the perforated plates kept free from dust by movable knockers, or it may be shaken as described, and the knockers dispensed with. Either of the dust arresting and separating devices may be used without the other, or any other suitable device for the purpose may be substituted for them, although the devices herein shown and described are particularly well adapted for the purpose, and especially in combination with each other.

I do not wish to be understood as limiting myself to the opening of the return air duct into the purifier chamber above or below the sieve, or both.

I find in practice that it is desirable, if not indispensable, to provide an outlet opening S in the fan case with a valve or slide $s$, by which the size of the opening is regulated in order to discharge any excess of air which may be drawn into the machine through open joints and would otherwise interfere with proper circulation of air therein.

By means of the relief opening above mentioned the back pressure and consequent obstruction to the current through the purifying chamber and imperfect separation of impurities from the middlings which would otherwise be produced by the surplus air drawn into the machine as above described, are effectually avoided.

I claim—

1. In a separating and purifying machine the combination of a substantially air tight purifying chamber, a return air duct constituting therewith an endless air belt or circuit, a fan arranged to produce a continuous current therein, and dust arresting and separating devices consisting of one or more perforated plates and one or more rotary hollow cylinders having perforated peripheries interposed across said air belt or circuit at convenient points therein, substantially as and for the purposes set forth.

2. In a separating and purifying machine, the combination of a substantially air tight purifying chamber, a return air duct constituting therewith an endless air belt or circuit, a fan arranged to produce a continuous current therein, a shaking sieve inclosed in said purifying chamber, and dust arresting and separating devices consisting of one or more perforated plates and one or more rotary hollow cylinders having perforated peripheries interposed across said air belt or circuit at convenient points therein, substantially as and for the purposes set forth.

3. In a separating or purifying machine, the combination of a substantially air tight casing inclosing a purifying chamber, a sieve inclosed in said casing, a return air duct connecting opposite ends of said chamber and constituting therewith an endless air belt or circuit, a fan located at a convenient point in said circuit, and a dust arresting and separating device in said circuit, consisting of one or more plates formed with ribs having perforations in their sides, and with imperforate portions between said ribs, substantially as and for the purposes set forth.

4. In a separating or purifying machine, the combination of a substantially air tight casing inclosing a purifying chamber, a return air duct connecting opposite ends of said chamber and constituting therewith an endless air circuit, a fan arranged to produce a continuous current therein, and a dust arresting and separating device consisting of one or more plates interposed at a convenient point across said circuit in an inclined position and formed with vertically disposed ribs having perforations in their sides and with imperforate portions between said ribs, substantially as and for the purposes set forth.

5. In a separating or purifying machine, the combination of a substantially air tight casing inclosing a purifying chamber, a return air duct connecting opposite ends of said chamber and constituting therewith an endless air circuit, a fan arranged to produce a continuous current therein, and a dust arresting and separating device consisting of one or more inclined plates placed across said circuit transversely to the direction of the current and formed on the upper side with vertically disposed ribs having perforations in their sides and with imperforate depressed portions between said ribs, for catching and conducting off the dust and impurities separated from the dust laden air, substantially as and for the purposes set forth.

6. In a separating or purifying machine, the combination of an endless air circuit, a fan arranged to produce a continuous current therein, a dust arrester and separator consisting of one or more inclined plates placed transversely across said circuit and formed on their upper sides with vertically disposed ribs having perforations in their sides and with imperforate channels between the ribs for catching and conducting off the dust and impurities separated from the dust laden air, and knockers arranged to jar said plates, substantially as and for the purposes set forth.

7. In a separating or purifying machine, the combination of an endless air circuit, a fan arranged to produce a continuous current therein and a dust arresting and separating device consisting of a rotary cylinder formed transversely to the plane of rotation with ribs, having perforations in one side, said cylinder having an open end and being so arranged in said circuit as to compel the current to pass into the same through its perforated periphery and out at its open end, substantially as and for the purposes set forth.

8. In a separating or purifying machine, the combination of an endless air circuit, a fan arranged to produce a continuous current therein, and a dust arresting and separating device located at a convenient point in said circuit and consisting of a rotary cylinder having an open end and formed transversely to the plane of rotation with ribs, having rearwardly opening perforations in their sides, said cylinder being so arranged in said circuit as to compel the current to pass into the same through its perforated periphery and out at its open end, substantially as and for the purposes set forth.

9. In a separating and purifying machine, the combination of an endless air circuit, a fan arranged to produce a continuous current therein, a dust arresting and separating device consisting of a rotary cylinder having an open end and formed transversely to the plane of rotation with ribs having rearwardly opening perforations in their sides, and a brush or deflector adjacent to the periphery of said cylinder and arranged to remove or deflect dust and impurities therefrom, substantially as and for the purposes set forth.

10. In a separating and purifying machine, the combination of an endless air circuit, a fan arranged to produce a continuous current therein, and a dust arresting and separating device consisting of a hollow cylinder mounted upon the fan shaft and opening at one end into the fan case, the periphery of said cylinder being formed transversely to the plane of rotation with ribs having perforations in their sides and being so arranged in said circuit as to compel the air to pass into the same through said perforations and out through its open end, substantially as and for the purposes set forth.

11. In a separating or purifying machine, the combination of a substantially air tight purifying chamber, a return air duct constituting therewith a continuous air circuit, a fan arranged to produce a continuous circulation therein, and dust arresting and separating devices consisting of one or more inclined plates placed transversely across the air circuit at a convenient point therein, and each formed with vertically disposed perforations and imperforate portions between them for catching and conducting off the dust, and a rotary hollow cylinder having perforations in its periphery, which is inclosed and arranged so as to compel the air to pass through said perforations into the same, substantially as and for the purposes set forth.

12. In a separating or purifying machine, the combination of a substantially air tight purifying chamber, a return duct constituting therewith a continuous air circuit, a fan arranged to produce a continuous circulation therein, chambers inclosed on each side of the fan case and communicating therewith through its eyes and with said purifying chamber, and dust arresting and separating cylinders mounted on the fan shaft with perforated peripheries and open ends adjacent to the eyes of the fan case, substantially as and for the purposes set forth.

13. In a separating or purifying machine, the combination of a substantially air tight purifying chamber, a return air duct constituting therewith an endless circuit, a fan arranged to produce a continuous circulation therein, and dust arresting and separating devices consisting of one or more inclined plates placed transversely across the air circuit at a convenient point therein, and each formed with vertically disposed perforations and imperforate portions between them for catching and conducting off the dust, and of a rotary hollow cylinder having perforations in its periphery, which is inclosed and so arranged as to compel the air to pass through said perforations into the same, a sieve inclosed in said chamber and a brush arranged to traverse the under side of said sieve, substantially as and for the purposes set forth.

14. In a separating or purifying machine, the combination of a substantially air tight purifying chamber, a return duct constituting therewith an endless circuit, a fan arranged to produce a continuous circulation therein, dust arresting and separating devices interposed at convenient points in said circuit and consisting of one or more plates placed across said circuit and formed with vertically disposed perforations and imperforate portions between them for catching and conducting off the dust, and of a rotary hollow cylinder having a perforated periphery so arranged in said circuit as to compel the current to pass into the same through the perforations therein, and a shaking sieve inclosed in said chamber, said return duct having an opening underneath said sieve whereby an upward current is produced through said sieve and dust and light impurities are prevented from lodging thereon, substantially as and for the purposes set forth.

15. In a separating or purifying machine, the combination of a casing inclosing a substantially air tight purifying chamber, a return air duct connecting opposite ends or sides of said chamber, and constituting therewith an endless air belt or circuit, a fan arranged to produce a continuous circulation of air therein, a dust arresting and separating device consisting of one or more inclined plates placed transversely across the air circuit and formed with vertically disposed perforated ribs and with imperforate portions between them, and a partition provided with one or more regulating valves interposed across said circuit between said dust arresting and separating device and said fan, substantially as and for the purposes set forth.

16. In a separating or purifying machine, the combination of a substantially air tight purifying chamber, a return air duct constituting therewith an endless air belt or circuit, and a fan arranged to produce a continuous circulation of air therein, said return air duct being provided with a relief outlet opening and with a regulating valve or slide, substantially as and for the purposes set forth.

In testimony that I claim the foregoing as my own I affix my signature in presence of two witnesses.

JOSEPH LA CROIX.

Witnesses:
 CHAS. L. GOSS,
 E. G. ASMUS.